UNITED STATES PATENT OFFICE.

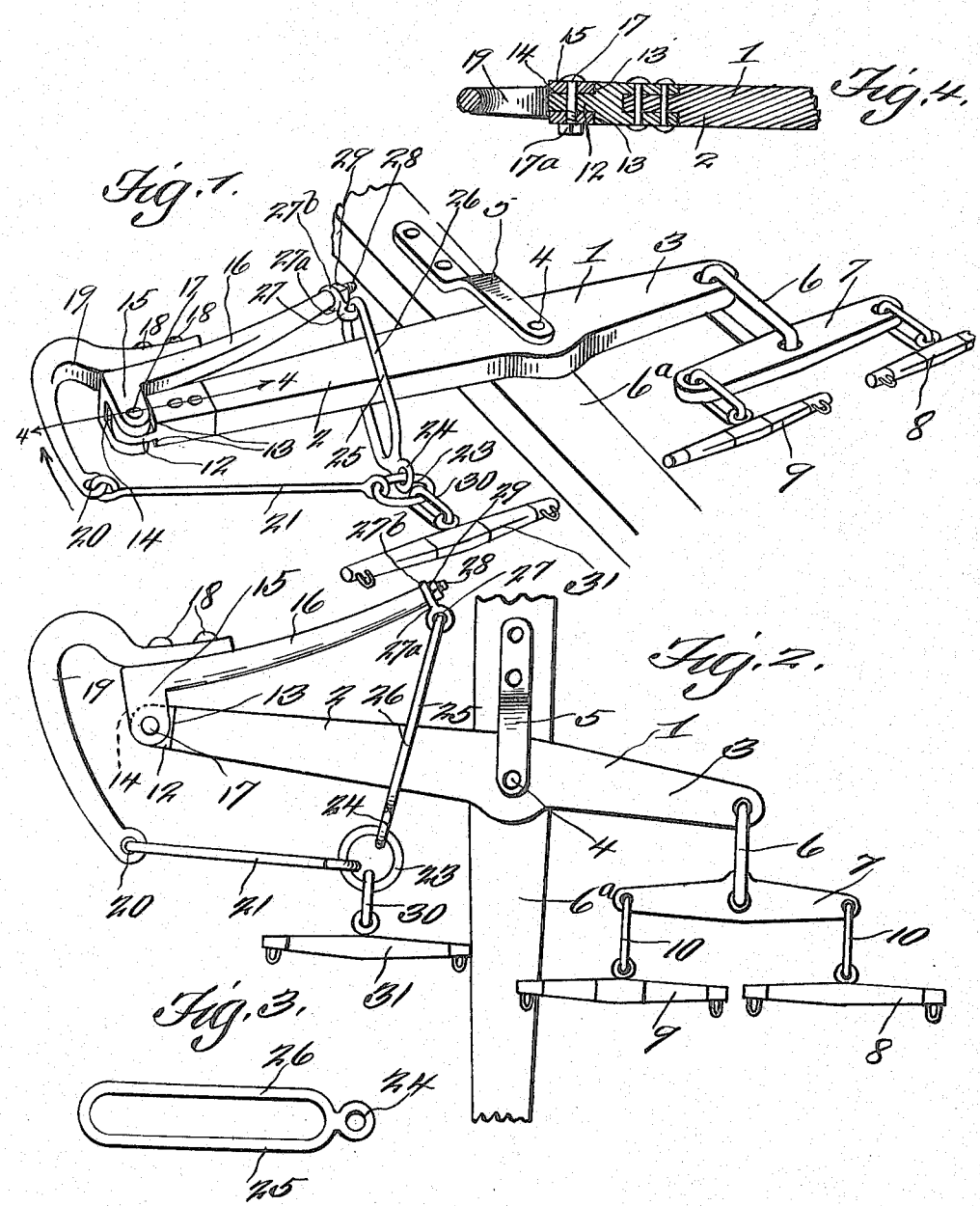

ROBERT A. McCALL, OF ANSON, TEXAS.

DRAFT-EQUALIZER.

1,129,997.  Specification of Letters Patent.  Patented Mar. 2, 1915.

Application filed September 26, 1913. Serial No. 792,038.

*To all whom it may concern:*

Be it known that I, ROBERT A. MCCALL, a citizen of the United States, residing at Anson, in the county of Jones and State of Texas, have invented a new and useful Draft-Equalizer; and I do hereby declare the following to be a full, clear, and exact description of the invention, such as will enable others skilled in the art to which it appertains to make and use the same.

This invention relates to a new and useful improved draft equalizer.

As an object of the invention it is the aim to provide an improved equalizer adapted for use in connection with three draft animals, one pulling against two animals, and constructed in such wise that the single draft animal (which heretofore is connected to the long arm of the main equalizing beam and disposed a considerable distance on one side and from the tongue or pole) may be disposed considerably closer to the tongue or pole than heretofore, and at the same time have a resilient equalizing draft relative to the other two animals on the other side of the pole or tongue. In carrying out these objects, it is the aim to provide a main equalizing beam having a long and short arm, to the short arm two draft animals are connected, while to the long arm a single draft animal is so connected by means of right angularly disposed links connected to a yieldable lever and a coöperating bracket arm (which yieldable lever is pivoted on the long arm), so that not only a yieldable draft on the long arm is attained, but so that such draft is so shifted between the points of connections of said links with the yieldable lever and the bracket arm, that the draft of the single horse will equalize with that of the two horses.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in perspective of the improved draft equalizer constructed in accordance with the invention. Fig. 2 is a plan view showing parts of the equalizer in different positions. Fig. 3 is an enlarged detail view of a portion of the equalizer. Fig. 4 is a sectional view on line 4—4 of Fig. 1.

Referring more particularly to the drawings 1 designates the main equalizing beam having a long arm 2 and short arm 3. This main equalizing beam is pivoted to the wagon tongue by the bolt 4, which passes through the strap 5 and the tongue $6^a$.

Connected to the short arm 3 of the main equalizing beam by means of the link 6 is a supplemental equalizing beam 7, to each end of which swingle-trees 8 and 9 are connected by the links 10.

The end of the long arm 2 of the main equalizing beam is constructed with a reduced portion 12, there being shoulders 13. This reduced portion 12 is arranged in the bifurcations 14 of the angle end 15 of the spring arm 16, which is arranged at an acute angle to the long arm of the main equalizing beam. Owing to the angled end of the spring arm engaging the shoulder 13, the spring arm will yield toward and from the long arm 2 of the main equalizing beam. A pin 17 passes through the bifurcated angled end of the spring arm and through the reduced portion of the long arm 2 of the main equalizing beam.

Rigidly fixed to the spring arm as at 18 is a bracket arm 19 extending partially rearward and forwardly. Linked to the bracket arm as at 20 is a rod 21, which in turn is connected to a ring 23, to which the eye 24 of the member 25 is connected. This member 25 is constructed with an elongated loop 26 through which the long arm 2 of the main equalizing beam extends. The rear portion of the loop 26 engages an eye 27 of the member $27^a$. This member $27^a$ has an additional eye $27^b$ which receives the reduced ends 28 of the spring arm, there being a nut 29 threaded on the reduced end 28 to hold the eye in place. Connected to the ring 23 by the link 30 is a swingle-tree 31.

Referring to Fig. 2 of the drawing, and assuming that the spring arm or lever 16 is disposed in its operative position with the edges of the angled end 15 in contact with the shoulders 13 of the long arm of the main equalizing beam, so that the ring 23 and connection 20 are disposed considerably farther to the left, in other words, sufficiently, in order that the member or link 25 will assume a greater angle toward the left than is shown in Fig. 2, the draft of the single animal (which is designed to be connected to the swingle tree 31) will be shifted from the ring 23 on an angle substantially midway between the connections 20 and 27, so that the draft of the single animal will not only equalize with the draft of the other two animals, but that a resilient draft for the single animal will be attained.

The invention having been set forth, what is claimed as new and useful is:—

1. In combination, a main equalizing beam having long and short arms, a supplemental equalizing beam including swingle trees connected to the short arm, a resiliently mounted lever pivoted to the extremity of the long arm and lying in the rear thereof and provided with a bracket arm terminating forwardly of but offset from the extremity of the long arm, a swingle tree, and connections between the swingle tree and the resilient lever and bracket arm, whereby the draft is not only shifted substantially midway between the points of connection of said connections with the lever and the bracket arm so that the draft of the single animal will equalize with the draft of two other animals connected to the first swingle tree, but that a resilient draft is attained.

2. In combination, a main equalizing beam having long and short arms, a supplemental equalizing beam connected to the short arm and including a pair of swingle trees, a resilient lever having an angled bifurcated end pivotally connected to the long arm and arranged at an acute angle to the long arm in the rear thereof, said long arm having abutting shoulders to be engaged by the angled end of said lever to insure resiliency, a bracket arm connected to the resilient lever at the rear and terminating forwardly of but offset from the pivot of the resilient lever, a swingle tree, a link connecting said swingle tree and the resilient end portion of said lever, and a rod connecting the free end of the bracket arm and said swingle tree, said link and rod being so arranged, that the draft is shifted substantially midway between the point of connections between the link and the lever and the bracket arm to the rod to the lever and the bracket arm so as to equalize with the draft on the first two swingle trees, and at the same time attain a resilient draft.

In testimony whereof I have signed my name to this specification in the presence of two subscribing witnesses.

ROBERT A. McCALL.

Witnesses:
  GUY R. HOLCOMB,
  E. V. MADDOX.

Copies of this patent may be obtained for five cents each, by addressing the "Commissioner of Patents, Washington, D. C."